United States Patent [19]

Brauninger et al.

[11] Patent Number: 4,896,263
[45] Date of Patent: Jan. 23, 1990

[54] MULTI-MICROCOMPUTER SYSTEM

[75] Inventors: Jurgen Brauninger, Stuttgart; Albrecht Sieber, Ludwigsburg, both of Fed. Rep. of Germany

[73] Assignee: Robert Bosch GmbH, Stuttgart, Fed. Rep. of Germany

[21] Appl. No.: 201,343

[22] Filed: May 26, 1988

Related U.S. Application Data

[63] Continuation-in-part of Ser. No. 941,285, Dec. 12, 1986, abandoned.

[30] Foreign Application Priority Data

Dec. 13, 1985 [DE] Fed. Rep. of Germany ....... 3543996

[51] Int. Cl.4 .............................................. G06F 1/00
[52] U.S. Cl. .................................. 364/200; 364/222.4
[58] Field of Search ... 364/200 MS File, 900 MS File

[56] References Cited

U.S. PATENT DOCUMENTS

| | | | |
|---|---|---|---|
| 4,270,168 | 5/1981 | Murphy et al. | 364/200 |
| 4,387,426 | 6/1983 | Roberts | 364/200 |
| 4,532,593 | 7/1985 | Mouri et al. | 364/431.11 |
| 4,542,462 | 9/1985 | Morishita et al. | 364/431.04 |
| 4,556,955 | 12/1985 | Wright et al. | 364/900 |
| 4,558,416 | 12/1985 | Pauwels et al. | 364/900 |

Primary Examiner—Gareth D. Shaw
Assistant Examiner—Rebecca L. Rudolph
Attorney, Agent, or Firm—Frishauf, Holtz, Goodman & Woodward

[57] ABSTRACT

All but one of the microcomputers in a multi-computer system are equipped with a rapid-access read-write memory and a fixed content nonvolatile read-only memory. Each of these read-only memories, however, stores a multiplicity of varieties of one or more sets of data, so that, in the case of a computer system for a motor vehicle engine, the same system can be used in any of a large number of vehicle models. One of the microcomputers of the system has a programmable memory which is programmed at the time of installation to designate the portions of the fixed memories that are to be utilized. When the system is turned on, the programmed memory designation number is stored in the read-write memory of all of the computers of the system, with the result that the designated portion of each fixed read-only memory is always referred to in any computer of the system. It is not important that, when the system is turned off, the memory content of the read-write memories is lost.

2 Claims, 4 Drawing Sheets

MULTI-MICROCOMPUTER SYSTEM

This application is a continuation-in-part of application Ser. No. 941,285, filed Dec. 12, 1986, now abandoned.

This invention concerns systems composed of two or more microcomputers that serve different functions or aspects of a machine or installation, for example, a motor vehicle, and are connected together for coordination.

In such multi-microcomputer systems, it is common for only one computer to be equipped with a programmable read-only memory, such as often referred to for short as a PROM, an EPROM or an EEPROM. The remaining computers of the multiple system have access only to a read-only memory (ROM), the contents of which are not subject to change. All of the computers have read-write memories, generally of the random access type (RAM) but these make available very small storage capacity that is not sufficient to hold all the data necessary for operation. Of course, all the computers of such a multi-microcomputer system are connected together so that exchange of information can take place, but for reasons of time requirements, obtaining information from another microcomputer is not always or even regularly possible, particularly when the computers are connected only by serial data lines.

Multi-microcomputer systems are used for example in the control electronics of motor vehicles. In such applications, it is basically possible to provide a multi-microcomputer system that is not limited to serving in a motor vehicle of a particular make, but it is necessary to provide different data in the read-only memories of the individual computers for each make of vehicle and even for different vehicle types of the same make. Multi-microcomputer systems heretofore known accordingly needed to be equipped in each case by the microcomputer manufacturer with ROM components designed for the particular vehicle type.

SUMMARY OF THE INVENTION

It is an object of the present invention to provide a multi-microcomputer system capable of use in different vehicle types and even in different vehicle makes and in which the adaptation to a particular vehicle make and type can be performed by programming the memory of a single one of the microcomputers of the system.

Briefly, the system includes one microcomputer having a nonvolatile programmable read-only memory and all the other microcomputers of the system have only a fixed read-only nonvolatile memory, but each such fixed read-only memory contains several varieties of the set of data to be utilized by the particular microcomputer. These varieties are stored so that each variety of the set of data is accessible under a different designation. The microcomputer that has a programmable read-only memory has the designations for the several varieties of the various sets of data in that memory and the memory is programmed at the time of installation of the system for the designation which selects the proper sets of data in the respective fixed read-only memories of the other microcomputers. Then the microcomputer with the programmable memory is programmed so that whenever it is turned on, or at some other stage of its operation, the memory variety designation is stored in the read-write memory of that particular microcomputer and it is also caused to be stored in the read-write memories of the other microcomputers of the system, causing the latter always to utilize the particular portion of the fixed read-only memory thus designated for use.

The invention has the advantage that the purchaser or user of the microcomputer system can carry out the adaptation or fitting of the microcomputer system to suit any of a considerable number of application conditions and that this operation on a freely programmable read-only memory assures that at at the beginning of computer system operation, the computer with the programmable memory will have access to the read-write memories of all of the computers of the system to write the necessary designations in each of them which in turn will give the individual microcomputer access to corresponding designated fixably stored sets of data. In the ordinary read-only memories, several varieties of the particular set of data are stored which are selectively activated according to the particular application of the system in response to the corresponding designation in the read-write memory of the particular microcomputer. The user of the system needs merely to enter the selected designation in the single programmable memory of the system.

As a result of the invention, unitary multi microcomputer systems can be produced that can be fitted to very different applications, reducing costs of manufacture and of product storage. The memories are so compact that equipping each system with all of the selectable varieties of data involves small additional costs compared to the economy of scale involved in making the same unit available for a wide variety of uses and in making it possible in the distribution of equipment to stock only one model for a wide range of demand.

A particular development of the invention contemplates that the data in a read-only memory would be subdivided into blocks, with each block being available in a number of variations selectable by corresponding designations. This disposition of the data in each ROM makes sets of data accessible by a block address with its own designation and makes varieties of each set accessible by a variation designation that selects a particular variety of the set of data to which the particular block pertains.

It is also possible in accordance with the invention to reduce the ROM storage capacity necessary for making available several varieties of each set of data, at least in certain cases, by storing one set of data, from which the varieties may be derived by modification of the data by a stored constant which takes the place of the variety designation mentioned above. Thus the fixed data stored in the ROM can be modified by the stored constant additively or it could be modified by the stored constant by multiplication thereby as might be more appropriate for the particular kind of data. The stored constant in such a case could be stored in the programmable read-only memory of the system and then regularly written in at an early stage of operation in the read-write memory of the computers involved.

BRIEF DESCRIPTION OF THE DRAWINGS

The invention is further described by way of illustrative example with reference to the annexed drawings, in which.

DESCRIPTION OF THE ILLUSTRATED EMBODIMENT

Figure 1:
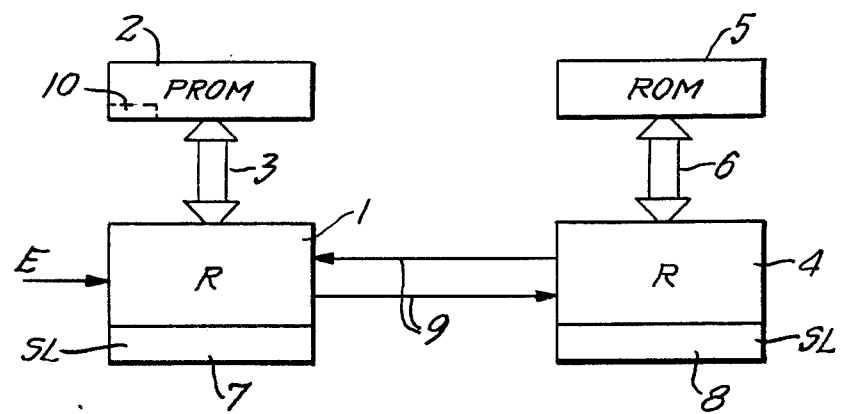
FIG. 1 is a basic diagram of a multi-microcomputer system according to the invention having, for purposes of illustration, just two microcomputers each having a nonvolatile memory.

A programmable read-only memory 2 is associated with a computer 1 in the two-computer system shown. A data bus 3 connects the computer 1 and the PROM 2 for exchange of data between the computer and PROM.

A second computer 4 is provided only with a fixed content read-only memory 5, to which it is, again, connected by a data bus 6 for exchange of data. The computer 4 and the computer 1 each comprise a read-write memory 7, 8. There is a two-way serial data connection 9 between the computers 1 and 4 and the computer 1 has a serial data input E.

The ROM 5 of the microcomputer 4 can for example contain sixteen different sets of data fixably stored therein. In the programmable read-only memory 2, to which the computer 1 has access, a storage area 10 is provided in which the designating number of the set of data that should be used by the computer 4 in a particular installation is stored in accordance with the configuring of the computer system in a particular application (e.g., installation in a particular make and type of vehicle). The designating number of this set of data remains stored in the PROM 2 until a re-configuring of the computer system is carried out, as might be necessary if the system were transferred from one model of vehicle to another model of vehicle.

At the beginning of the running of a program, e.g., upon switching on the operating voltage, the computer 1 always transfers the designating number of the data set to the computer 4 over the serial data connection 9 and that designating number then continues to be stored in its read-write memory 8. If now the computer 4 needs to use data from the ROM 5, it obtains the data stored in the set of data of which the designating number is stored in its read-write memory. An example of the use of data thus obtained is explained in connection with the description of FIG. 2.

When the operating voltage is switched off or when the computer system is turned off, this designating number stored in the read-write memory is lost and is not written in anew until the system is switched on again.

Figure 2:
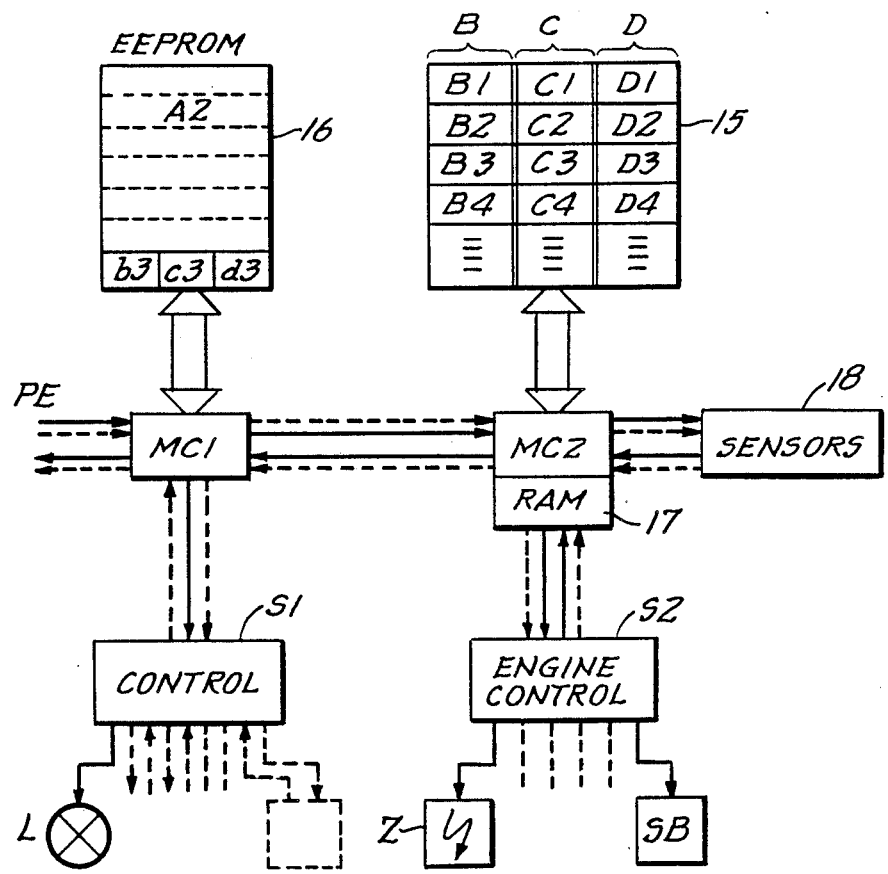
FIG. 2 is a more detailed circuit block diagram of a multi-microcomputer system according to the invention having two microcomputers, also illustrating control devices for which the microcomputers are used to control in the illustrated case.

FIG. 2 shows, in more detail than FIG. 1, a multi-microcomputer system according to the invention containing two microcomputers MC1 and MC2. The system of FIG. 2 forms part of the control system for controlling various different functions of a motor vehicle, including operation for controlling the vehicle's internal combustion engine.

The multi-microcomputer system of FIG. 2 contains, in addition to the two microcomputers MC1 and MC2, a nonvolatile read-write memory 16 that in this case is in the form of a so-called EEPROM, which is connected to the first microcomputer MC1. A fixed read-only memory 15 is associated with the second microcomputer MC2. There is built into the second microcomputer MC2 a random access (read-write) memory (RAM) 17 into which, for example, a data statement can be stored temporarily, for example, any of the data statements B1, B2, B3, B4 . . . Bn stored in the fixed memory 15. The statements B1, B2, B3 . . . Bn are respective varieties of a basic statement B (not shown) to which they correspond in principle and together they occupy a memory block B. There are also memory blocks C and D in the fixed memory 15. Block C contains statements C1, C2 . . . Cn and Block D contains statements D1, D2 . . . Dn.

The microcomputer MC1 is connected to a first control unit S1 which is provided for control of pilot lights such as the luminous indicator L or other apparatus that may be of miscellaneous kinds.

The microcomputer MC2 is connected with the engine control unit S2 which controls the ignition system Z, the fuel injection start instant control unit SB and/or other engine control apparatus which in a known way may be present for control of an internal combustion engine. Thus, for example, the motor control unit S2 may also set the control rod or the throttle valve of an engine in a cruise control operation.

The microcomputer MC2 is also connected with a number of sensors, collectively designated, together with their circuits, by the block 18 of FIG. 2. These sensors deliver data regarding the engine speed, the position of the control rod or throttle valve responsive to the driver's actuation or to a cruise control system the motor temperature and/or other motor operating conditions.

Figure 3:
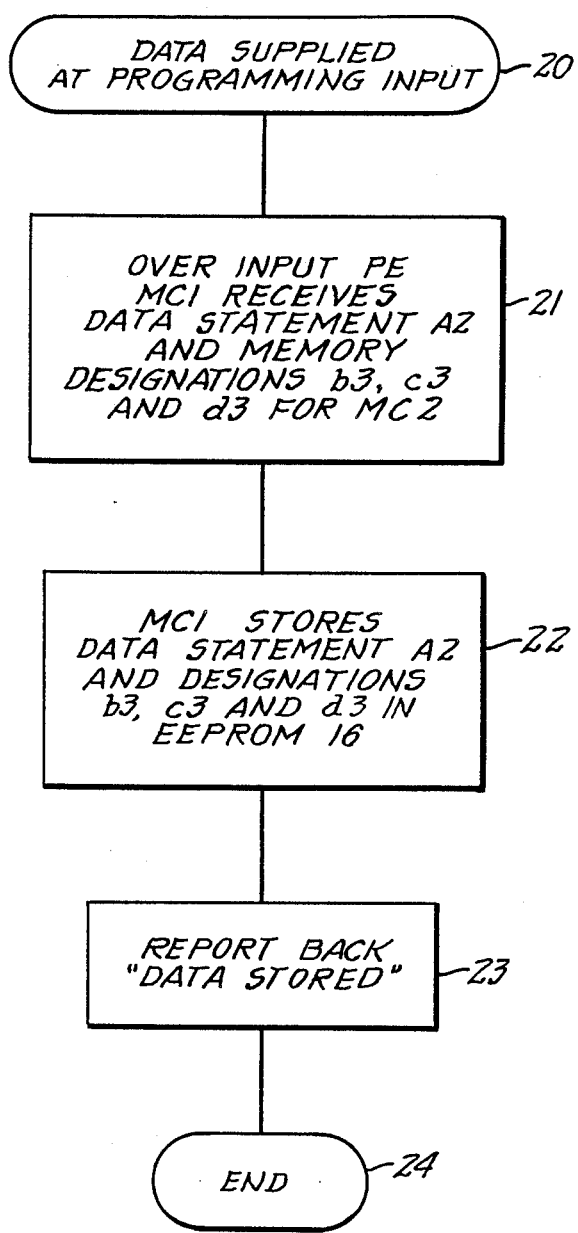
FIG. 3 is a flow diagram regarding entry of data to the programming input of a multi-microcomputer system of the kind illustrated in FIG. 2.

In connection with FIG. 3 a programming/loading procedure is explained such as takes place preferably in the manufacturer's production facilities, when the multi-microcomputer system is installed in a vehicle.

When the system is incorporated in a motor vehicle as original equipment, essential data for the particular motor type is put into the microprocessor MC1 through its programming input PE, shown at the left in FIG. 2. This operation stores the basic data via MC1 in the EEPROM 16 FIG. 3. In addition to some motor-specific and vehicle-specific statements of which the statement A2 is an example the EEPROM 16 is also loaded with the brief designations b3, c3, d3 which are the "keys" to certain statements in the blocks B, C and D of the ROM 15 connected to the microcomputer MC2.

In the flow chart of FIG. 3, the step of entering data in programming input is designated 20. In the next block 21 of the FIG. 3 chart, MC1 receives both data A2, for itself only, and key designations b3, c3 and d3 When this storing operation is confirmed as completed through the programming input PE, the data statement A2 and the key designations (which may be small numbers) remain continuously in the EEPROM 16, since the latter maintains its information thereafter even after the operating voltage is switched off. This step of storage is shown in block 22, FIG. 3.

Block 23 shows a report from the EEPROM back to the microcomputer MC1 and possibly also to a unit, not shown, to which the input PE is connected, signifying "data stored" . The operation then comes to an end as shown in block 24.

Figure 4:
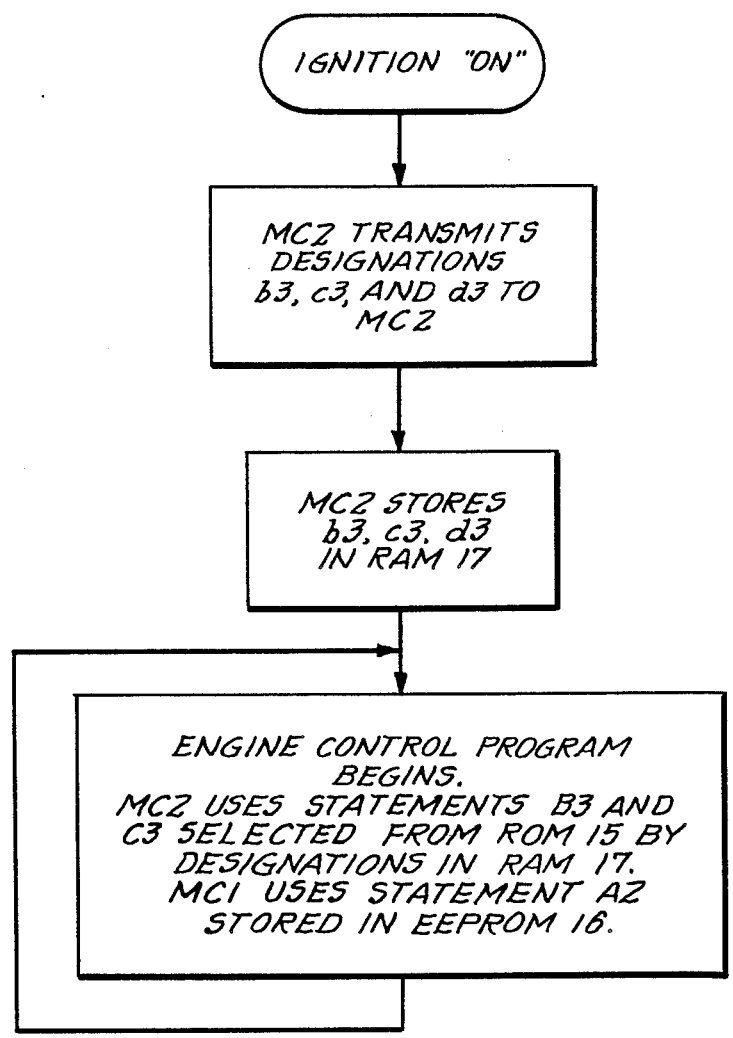
FIG. 4 is a flow diagram of the response of the microcomputer system of FIG. 2 to an engine ignition system signal in a motor vehicle microcomputer system of the kind shown in FIG. 2.

With reference to FIG. 4, as well as to FIG. 2, functioning of the system in normal operation will now be described.

When the vehicle's ignition key, operated by the driver of the vehicle, enables operation of the ignition system, the multi-microcomputer system is activated and statement designators (keys) b3, c3 and d3 are obtained from the EEPROM 16, and furnished by the microcomputer MC1 to the second microcomputer MC2, which puts them into its RAM 17, and then uses them to put the statements B3, C3 and D3 or any part of them into the RAM 17 for use at such times as its program instructs it to do so. Thus the microcomputer MC2 has access to statements B3, C3 and D3 for use in engine control but not to any other statements in the memory blocks B,C and D of the memory 15 The end of the motor control program has been left out in FIG. 4 to simplify the diagram.

Statement D3 may, for example be an emergency data statement to which the microcomputer MC2 will have access in case of damage to or failure in the system. Thus in a very simple way an emergency operation function can be provided. Each microcomputer of a multi-computer system may have its own emergency data statement.

The microcomputer MC1, on its own, pulls out the data statement A2 which is stored in the EEPROM 6 Then, taking account of the data of that statement A2, the microcomputer MC1 controls certain other functions by way of its connection with the control unit S1 of the motor vehicle. Through control unit S1, for example, the parking brake lamp will go on until the brake is released Similar programmed memory will produce other operating condition notifications, as for example a pilot light for the fuel pump.

Each of the data statements can contain several operating parameters necessary for control of the engine and of other functions. A data statements can thus designate a characteristic curve or an engine characteristic field to which the microcomputer MC1 or MC2 needs to have access in operation. The concept "data statement" therefore does not necessarily mean a mere item of fact and may include a complete table, perhaps in more than two "dimensions".

Figure 5:
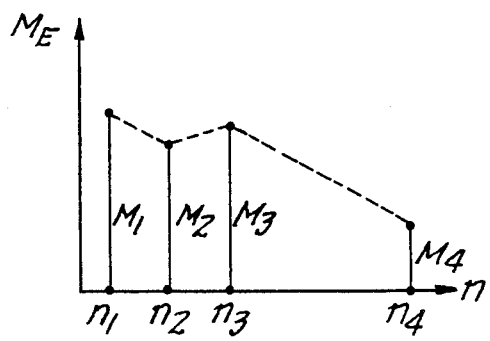
FIG. 5 is a timing digram relating to the operations to which the flow diagram of FIG. 4 pertains.

With reference to FIG. 5 a simple example of a characteristic curve is shown, the parameters of which may be a part of a data statement. In this case, the course of the "start fuel quantity" defines the quantity of fuel supplied during the starting of the vehicle engine and is specified in a manner dependent upon the engine speed n. The course of the start quantity ME is accordingly specified by the four parameter values M1, M2, M3 and M4 and their related engine speed values n1 to n4. If now the microcomputer MC2 receives information from the engine speed sensor that the engine speed n2 is reached in the engine, then according to the parameter values stored in the data statement B3, the fuel quality M2 is set in the motor control unit S2 for supplying fuel to the engine. In a similar manner other functions can also be controlled.

It will be evident from the foregoing description that more than two computers can be put together in a system according to the present invention and that only one of the computers of the system needs to have a programmable read-only memory. Thus, although the invention has been described with reference to a particular illustrative example, it will be understood that variations and modifications are possible within the inventive concept.

What is claimed:

1. Multi-microcomputer system, comprising first and second microcomputers each having a central processor and a read-write memory and means for connecting said microcomputers with each other by at least a two-way serial data line, said first microcomputer further having, connected directly thereto, a nonvolatile programmable read-only memory, and second microcomputer having connected directly thereto a nonvolatile fixed read-only memory which is its only nonvolatile memory, said fixed read-only memory containing several varieties of a set of elements of stored data, all said varieties having corresponding elements differing from each other in the value of at least one element of said set of stored data, each said variety of stored data being stored for read-out responsive to a different designation, said programmable read-only memory of said first microcomputer being programmable during the initialization of said multi-microcomputer system to transmit only a predetermined one of said different designations for selecting a corresponding one of said varieties of said set of elements of data stored in the read-only memory of said second microcomputer, means being provided in said first microcomputer for causing said predetermined designation to be written, at initialization of said multi-microcomputer system, into said read-write memory of said second microcomputer and means being provided in said second microcomputer for writing said predetermined designation when ever received, into said read-write memory of said second computer and for selecting, in response thereto, said corresponding variety of the set of elements of data stored in the read-only memory of said second microcomputer, for use during the remainder of a period of continuous operation, after said initialization, of said multi-microcomputer system, to the exclusion during said period of all other said varieties of said set of elements of data stored in said read-only memory of said second microcomputer.

2. Multi-microcomputer system, comprising a plurality of microcomputers each having a central processor and a read-write memory and means for connecting said microcomputers with each other by at least a two-way serial data line, said plurality of microcomputers comprising a first microcomputer further having, connected directly thereto, a nonvolatile programmable read-only memory, and also comprising a plurality of additional microcomputers each having, connected directly thereto, a fixed read-only memory which is its only nonvolatile memory, said fixed read-only memory in each case containing several varieties of a set of elements of stored data, all said varieties having corresponding elements of said set and differing from each other in the respective values of at least one element of said set of stored data; each said variety of stored data being stored for read-out responsive to a different designation, said programmable read-only memory of said first microcomputer being programmable during the initialization of the multi-microcomputer system to transmit only a predetermined one of said different designations for selecting a corresponding one of said varieties of said set of elements of data stored in the read-only memory of each of said additional microcomputers, means being provided in said first microcomputer for causing said predetermined designation to be written, at initialization of the multi-microcomputer system, into said read-write memories of said respective additional computers and means being provided in each of said additional microcomputers for writing said predetermined designation, when received in the respective additional microcomputers, into their respective read-only memories and for selecting, in response thereto, said designated variety of the set of elements of data stored in the read-only memories of said respective additional microcomputers for use during the remainder of a period of continuous operation, after said initialization, of said multi-microcomputer system to the exclusion during said period of all other said varieties o said set of elements of data stored in said respective read-only memories.

* * * * *